US005134505A

United States Patent [19]

Tanaka et al.

[11] Patent Number: 5,134,505

[45] Date of Patent: Jul. 28, 1992

[54] PUSH-BUTTON SWITCH WITH LIQUID-CRYSTAL DISPLAY

[75] Inventors: Tokuo Tanaka; Takeo Takei, both of Tokyo, Japan

[73] Assignee: Nihon Kaiheiki Industrial Company, Ltd., Japan

[21] Appl. No.: 643,227

[22] Filed: Jan. 22, 1991

[30] Foreign Application Priority Data

Jun. 26, 1990 [JP] Japan .............................. 2-66868[U]

[51] Int. Cl.[5] .............................................. G02F 1/13

[52] U.S. Cl. ........................................ 359/48; 359/83

[58] Field of Search ................... 350/334, 345, 339 D, 350/331 R; 340/765; 362/219, 225; 359/48, 83, 84; 200/341, 345, DIG. 47

[56] References Cited

U.S. PATENT DOCUMENTS 4,196,581 4/1980 Nemoto .......................... 350/345 X
4,294,517 10/1981 Jakubek ............................... 350/345
4,357,061 11/1982 Crosby ................................ 350/334
4,422,728 12/1983 Andreaggi ........................... 350/334
4,514,920 5/1985 Shajrir et al. ................... 350/334 X
4,573,766 3/1986 Bournay, Jr. et al. .............. 350/345
4,755,035 7/1988 Kopish et al. ........................ 350/345
4,989,956 2/1991 Wu et al. ............................. 350/345

*Primary Examiner*—Stanley D. Miller
*Assistant Examiner*—Huy K. Mai
*Attorney, Agent, or Firm*—Lorusso & Loud

[57] ABSTRACT

The present invention provides a switch in which a liquid-crystal panel is arranged on the top side of a push-button so that such information as characters, symbols and figures is capable of being displayed, wherein a plurality of light-emitting bodies which emit light in a number of colors are arranged below the light-emitting panel so that the color of the liquid-crystal panel is capable of being changed. The liquid-crystal panel on the top surface of the push-button is white in color, a diffusing plate is disposed below the liquid-crystal panel, and the light-emitting bodies are arranged to oppose the periphery of the diffusing plate. As a result, the color of the overall display portion on the top surface of the push-button can be changed.

4 Claims, 2 Drawing Sheets

PUSH-BUTTON SWITCH WITH LIQUID-CRYSTAL DISPLAY

BACKGROUND OF THE INVENTION

This invention relates to a liquid-crystal display-type push-button switch having a liquid-crystal panel arranged on the top surface of a push-button.

A conventional switch of this type is as illustrated in FIG. 1 and includes a push-button 1, a display portion 2, which consists of a liquid-crystal panel, provided on the top surface of the push-button 1, and an illuminating portion 3, consisting of a light-emitting body, provided at the periphery of the liquid-crystal panel.

However, in a liquid-crystal display-type push-button switch thus constructed, the illuminating portion 3 comprising the light-emitting body is arranged at the periphery of the display portion 2 comprising the liquid-crystal panel, and therefore enough space must be provided for the illuminating portion 3. This is disadvantageous in that the overall size of the switch is enlarged.

In addition, though the display of the liquid-crystal panel appeals to the sense of sight owing to the light-emitting body disposed at the periphery, the display portion of the liquid-crystal cell and the illuminating portion of the light-emitting body are spaced away from each other, and therefore the liquid-crystal display is difficult to read and can be read erroneously.

SUMMARY OF THE INVENTION

An object of the present invention is to solve the foregoing problems and provide a small-size push-button switch with a liquid-crystal display, in which the display is easy to read.

According to the present invention, the foregoing object is attained by providing a switch in which a liquid-crystal panel is arranged on the top side of a push button so that such information as characters, symbols and figures is capable of being displayed, wherein a plurality of light-emitting bodies which emit light in a number of colors are arranged below the light-emitting panel so that the color of the liquid-crystal panel is capable of being changed. Furthermore, the composition of the color comprises the three properties of hue, brightness or luminosity and saturation.

The liquid-crystal panel on the top surface of the push-button is white in color, a diffusing plate is disposed below the liquid-crystal panel, and the light-emitting bodies are arranged to oppose the periphery of the diffusing plate.

In accordance with the present invention, in a switch having a liquid-crystal panel arranged on the top surface of a push-button so that such information as characters, symbols and figures is capable of being displayed, a plurality of light-emitting bodies which emit light in a number of colors are disposed below the liquid-crystal panel. Accordingly, the color of the overall display portion on the top surface of the push-button can be changed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the drawings.

Figure 1:
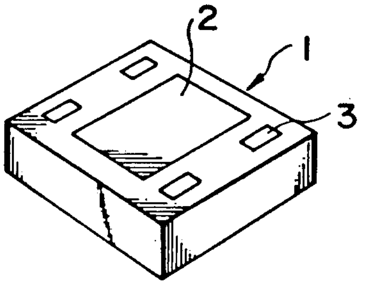
FIG. 1 (PRIOR ART)
FIG. 1 is a perspective view showing the push-button of a conventional push-button switch with a liquid-crystal display.
Figure 2:
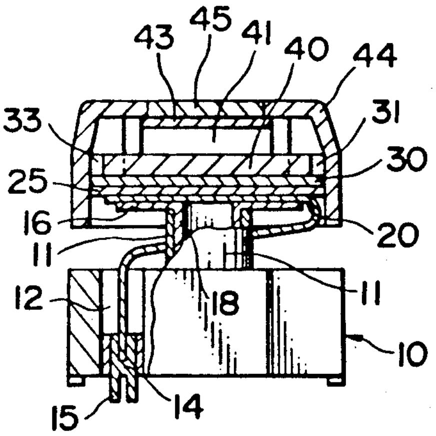
FIG. 2 is a sectional view showing the principal portions of a push-button switch with a liquid-crystal display according to the present invention.
Figure 3:
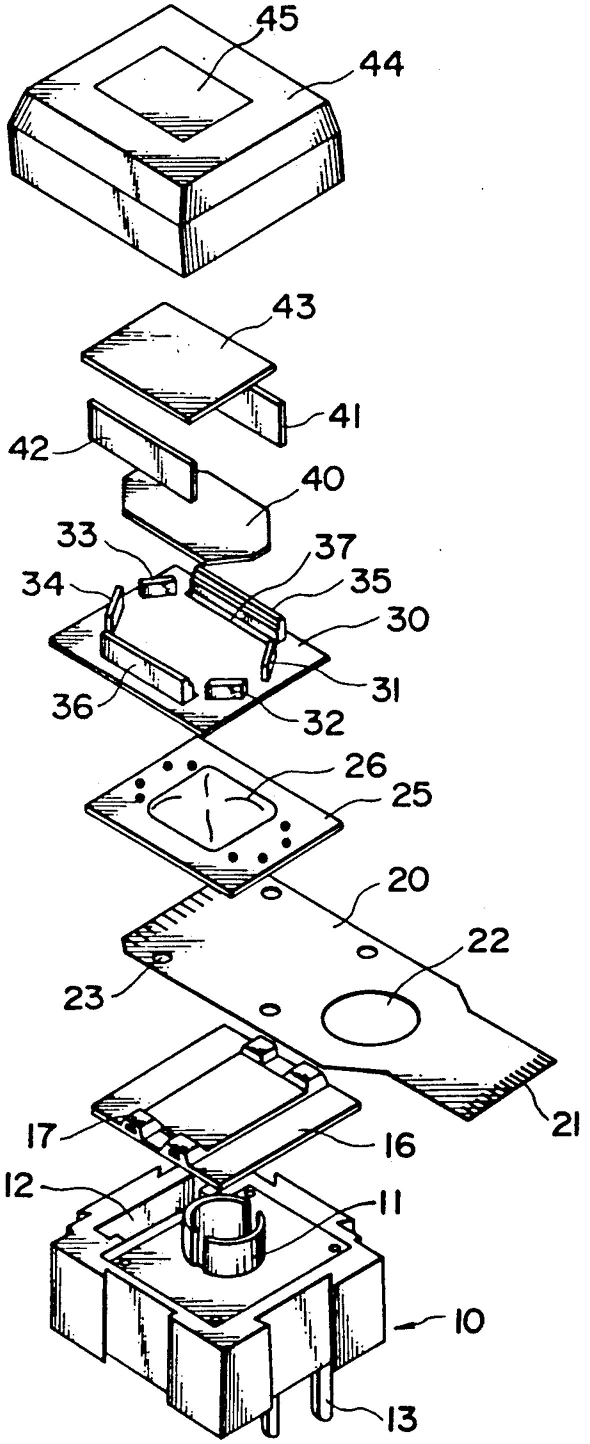
FIG. 3 is an exploded perspective view showing the push-button switch with a liquid-crystal display according to the present invention.
Figure 4:
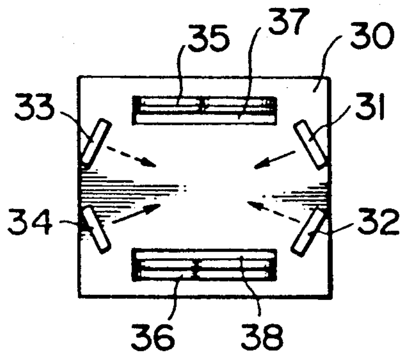
FIG. 4 is a plan view showing a holder in the push-button switch with a liquid-crystal display according to the present invention.

As shown in FIG. 2 through 4, a switch body 10 has a central portion in which an actuating shaft 11 is fitted. The left side of the switch body 10 is formed to have a recess 12 in the lower part of which is provided a connector 14 equipped with a terminal 15. A circuit pattern 21 on one edge portion of a flexible printed circuit board 20 is connected to the connector 14. A plunger 16 is situated at the upper end of the actuating shaft 11 and has projections 17 formed on two opposing edges. The flexible printed circuit board 20 is attached to the upper portion of the plunger 16. The flexible printed circuit board 20 is provided with a through-hole 22 penetrated by the actuating shaft 11, a mounting hole 23 at which a printed board 25 is attached, and the aforementioned circuit pattern 21, which is located on one edge portion. An IC chip 26 is mounted on the printed board 25, and a holder 30 is provided on the printed board 25. Two pairs of multicolored light-emitting bodies 31, 32 and 33, 34 are arranged on the holder 30.

The holder 30 is formed to have opposing projections 35, 36 on two sides thereof, as well as slots 37, 38 on the inward sides of the projections 35, 36, respectively. Connectors 41, 42 connected to a circuit pattern on the printed board 25 are fitted into the slots 37, 38, respectively, and are for applying voltage to a liquid-crystal panel 43. A diffusing plate 40 is disposed on the inward sides of the connectors 41, 42. A push-button 44 is provided so as to cover the assembly of parts described above, and the central portion of the push-button 44 is formed to have a display portion 45 comprising a light-transmissive member.

As set forth above, the liquid-crystal panel 43 is arranged on the bottom side of the display portion 45 of push-button 44. The connectors 41, 42 which connect the printed board 25 and the circuit pattern are disposed, in close proximity to the front and rear edges of the liquid-crystal panel 43 at the lower surface thereof, in the slots 37, 38 provided near the front and rear edges of the holder 30, and the diffusing plate 40 is accommodated in a prescribed space between the two connectors 41, 42. The multicolored light-emitting bodies 31 through 34, which emit light in a number of colors, are arranged about the periphery of the diffusing plate 40 to confront the same. In this embodiment, two pairs of multicolored light-emitting bodies 31, 32, 33, 34 are provided.

The printed board 25 is provided below the holder 30, and the IC chip 26 is mounted on the upper surface of the printed board 25.

Further, the flexible printed circuit board 20 has the mounting hole 23 for being fixedly secured, and the through-hole 22 through which is loosely inserted the actuating shaft 11 projecting below the plunger 16. The circuit pattern on the flexible printed circuit board 20 is connected to the circuit pattern on the printed board 25.

The plunger 16 is fitted resiliently into the space within the push-button 44. Thus, the components from the liquid-crystal panel 43 to the plunger 16 are accommodated within the push-button 44.

The switch body 10 has the recess 12 in one side thereof for receiving the connector 14, and accommodates the actuating shaft 11 which drives the contacts. A shaft 18 projecting downwardly from the plunger 16 and the actuating shaft 11 are interconnected so as to be capable of transmitting an operating force.

Figure 5:
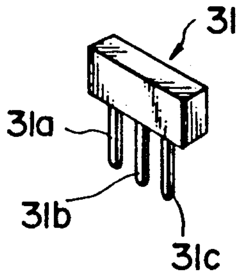
FIG. 5 is a perspective view showing a light-emitting body in the push-button switch with a liquid-crystal display according to the present invention.

The light-emitting body 31 (the construction of which is identical to that of the light-emitting bodies 32 through 34) in this embodiment has three terminals 31*a* through 31*c* (see FIG. 5). The light-emitting body used in such that by changing over the connection of these contacts, light can be emitted in either of two colors, namely red or green. In addition, by changing over the electrodes which apply plus and minus voltages to two terminals of the light-emitting body, various hues can be obtained.

In this case, the terminal 15 of connector 14 supplies electric power to the printed board 25 via the flexible printed circuit board 20, to the IC chip 26 and light-emitting bodies 31 through 34, and to the liquid-crystal panel 43 via the connectors 41, 42. Control of the display of the multicolored light-emitting bodies 31 through 34 and the liquid-crystal panel 43 is carried out by the IC chip 26. Various characters can be displayed and colors can be changed in a variety of ways. For example, by causing the light-emitting bodies 31, 32 to emit red light and the light-emitting bodies 33, 34 to emit green light, the back-lighting of the display portion can be changed to the color yellow.

Figure 6:
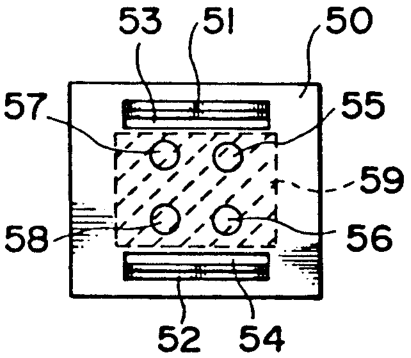
FIG. 6 is a plan view showing a holder in another embodiment of the push-button switch with a liquid-crystal display according to the present invention.

FIG. 6 is a plan view showing a holder in another embodiment of the push-button switch with a liquid-crystal display according to the present invention.

As shown in FIG. 6, the top surface of the holder 50 is provided with projections 51, 52 near its upper and lower edges, slots 53, 54 are provided on the inward sides of the projections 51, 52, respectively, connectors are inserted into the slots 53, 54, a plurality of light-emitting bodies 55 through 58 which emit light in a number of colors are disposed between the slots 53, 54, and a diffusing plate 59 is disposed on the top surfaces of the light emitting bodies 55 through 58.

More specifically, the plurality of light-emitting bodies 55 through 58 are arranged on the holder 50, which abuts against the lower side of the liquid-crystal panel (not shown), and the diffusing plate 59 is disposed between the liquid-crystal panel and the light-emitting bodies 55 through 58. This makes it possible to greatly reduce the amount of space required.

Figure 7:
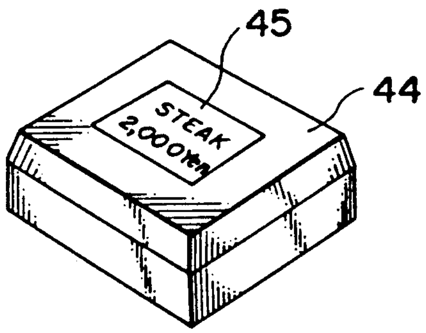
FIG. 7 is a perspective view showing the push-button in a push-button switch with a liquid-crystal display and illustrating an example in which the present invention is used.

FIG. 7 is a perspective view of the push-button switch with a liquid-crystal display and illustrates an example in which the present invention is used.

In this example, the push-button switch of the present invention is used in a ticket vending machine such as that found in a restaurant. For instance, "STEAK, 2000 Yen" can be displayed on the display portion 45 of the push-button 44 by means of the liquid-crystal panel. If the display portion 45 is illuminated in the color of green light emitted by the light emitting bodies (not shown), this will indicate that the displayed item "STEAK" is capable of being ordered. If the display portion 45 is the color red, then this will indicate that this item has been sold out. This manner of use is possible in a variety of automatic vending machines.

It should be noted that the present invention is not limited to the foregoing embodiments but can be modified in various ways based on the gist of the invention without departing from the scope thereof.

In accordance with the present invention, as described in detail above, the following advantages are obtained:

(1) Light-emitting bodies which emit light in a number of colors are disposed below a liquid-crystal panel so that the color of the display portion of a push-button can be changed in a variety of ways.

With such an arrangement, it is unnecessary to separately provide light-emitting bodies, which are for presenting a display, about the periphery of the display portion on the top surface of the push-button, as is required in the prior art. Thus, correspondingly less space is needed, and therefore the switch can be manufactured in a smaller size.

(2) Light-emitting bodies need not be provided about the periphery of the display portion on the top side of the push-button, as in the prior art, and the arrangement is such that the entirety of the display portion at one location can be changed in color. As a result, the display portion can be increased in size, and the color of the display surface can be changed. This makes the display easier to read and prevents erroneous reading of the display.

(3) By using a white or near-white color tone for the liquid-crystal panel of the push-button, a clear color can be obtained. Accordingly, the state of the change in color of the light-emitting body will harmonize with the white color of the liquid-crystal panel, thereby furnishing a clearer color display. Such a display is easy to read and reduces eye fatigue.

(4) By employing a white or near-white color for the liquid-crystal panel, and by using the diffusing plate to change the colors of the light emitted by the light-emitting bodies opposing the diffusing plate, a display can be presented in a larger variety of colors.

(5) By using a white or near-white color tone for the liquid-crystal panel and arraying the light-emitting bodies about the periphery of the diffusing plate underlying the liquid-crystal panel, the light from the light-emitting bodies can be diffused very efficiently without being cancelled out. As a result, the display portion is very easy to read and light of a clear color can be emitted.

(6) The light-emitting bodies which emit light in a number of colors are disposed below the liquid-crystal panel so that the color of the display portion of the push-button can be changed. As a result, a function display which can be changed into a number of colors can be achieved merely by changing and arraying solely the light-emitting bodies without using a color liquid-crystal panel that is several times more expensive than an ordinary liquid-crystal panel.

What we claim is:

1. A push-button switch with a liquid-crystal display comprising:

a push-button having a top surface;

a liquid-crystal panel mounted on said top surface;

a plurality of light-emitting bodies mounted within said switch, below said liquid-crystal panel, for collectively emitting light to illuminate said liquid-crystal panel, at least one of said light-emitting bodies emitting light of a color different from the color of light emitted by a second of said light-emitting bodies; and switch means for selectively activating each of said light-emitting bodies for selectively changing the combination of light-emitting bodies activated at any one time to thereby change the color of said light collectively emitted by said light-emitting bodies and to alter the color of said liquid-crystal panel.

2. The push-button switch according to claim 1, wherein said liquid-crystal panel is white in color.

3. The push-button switch according to claim 1, further comprising a diffusing plate provided below said liquid-crystal panel, wherein said light-emitting bodies are arranged opposing the periphery of said diffusing plate.

4. The push-button switch of claim 1 further comprising means for changing voltage applied to said light-emitting bodies to change the hue of the emitted light.

* * * * *